March 26, 1963  J. W. JENKINS  3,082,792
PNEUMATIC ACTUATOR
Filed March 1, 1961

INVENTOR.
JOHN W. JENKINS
BY
Joseph E Ryan
ATTORNEY

United States Patent Office 3,082,792
Patented Mar. 26, 1963

3,082,792
PNEUMATIC ACTUATOR
John W. Jenkins, Hatlen Heights, Ill., assignor to Minneapolis-Honeywell Regulator Company, Minneapolis, Minn., a corporation of Delaware
Filed Mar. 1, 1961, Ser. No. 92,569
8 Claims. (Cl. 137—790)

My invention relates to pneumatic actuators and more particularly to an improved rolling diaphragm type pneumatic actuator.

Figure 2:
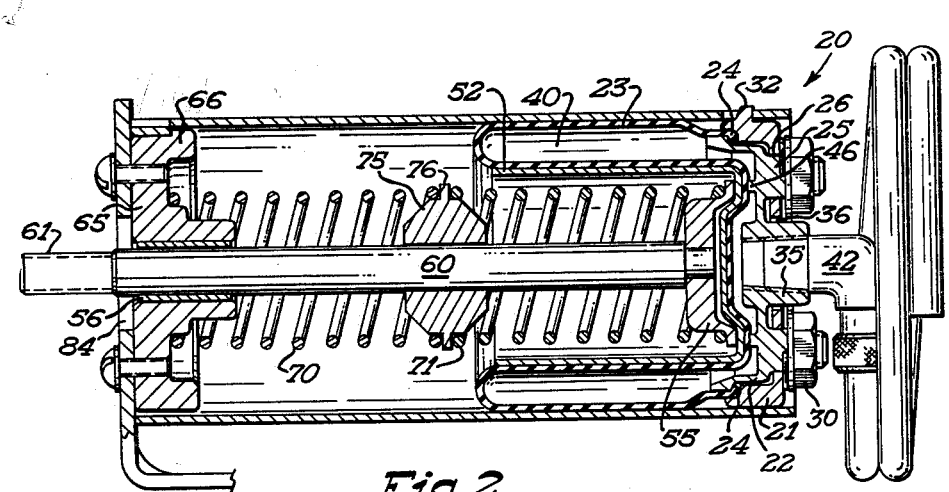
Figure 1:
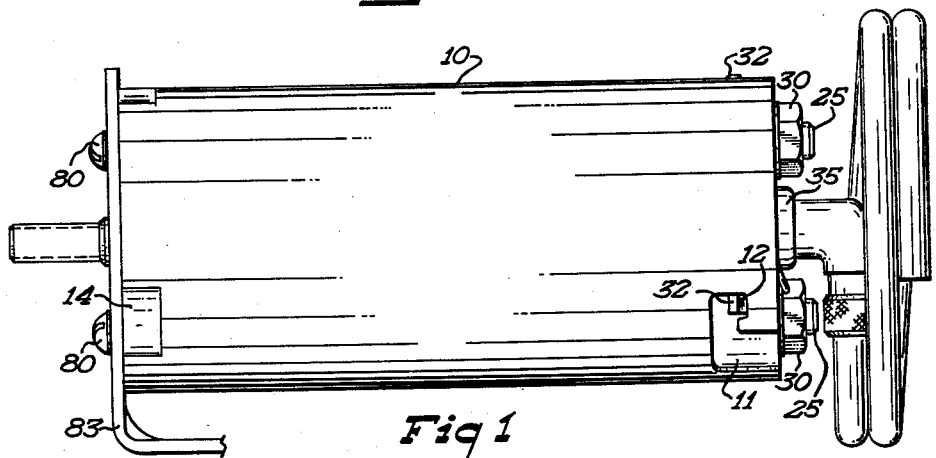
Figure 3:
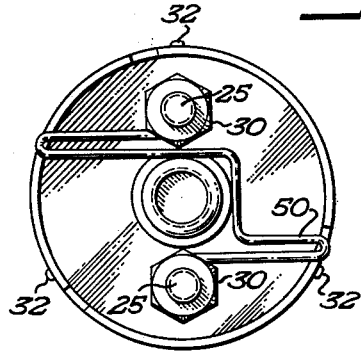

Pneumatic actuators using rolling diaphragms which are sometimes known as diaphragm piston type actuators are broadly old and well known. The present invention is directed to a simplified arrangement of parts providing a motor or actuator of this type which is simple to construct and assemble, and economical to manufacture and maintain. It is therefore an object of this invention to provide in a pneumatic actuator a simplified construction and arrangement of parts which is economical to manufacture and maintain. Another object of this invention is to provide in an actuator of this type an arrangement which is readily assembled and disassembled for check and maintenance purposes. These and other objects of this invention will become apparent from the reading of the attached description together with the drawings wherein:

FIGURE 1 is a planar view of the actuator,
FIGURE 2 is a sectional view of the actuator of FIGURE 1, and
FIGURE 3 is an end elevation view of the actuator.

As will be seen in the drawings, our improved diaphragm type actuator or motor includes a cylindrical casing member or tubular casing member 10. This part may be an extruded part or roll formed the sizing of which will be determined by the size or force of the output required from the actuator and the length of stroke of the same. Tubular member or casing member 10 has positioned about its peripheral extremities a plurality of retaining means which, as shown in the drawings, are latch type slots 11 having a latch portion 12 at one extremity and detent portions 14 positioned about the periphery of the other extremity. Any number of such slots and detent portions may be included at either extremity necessary to secure parts thereto and we have preferably found that three such slots or detents at either extremity prove satisfactory. Further, it will be recognized as the disclosure proceeds that the slotted latch portions or slots 11 may be included at both extremities if desired.

One end of the tubular casing member mounts a diaphragm assembly indicated generally at 20 which diaphragm assembly is comprised of an end plate 21, a clamping plate 22, and a cup-shaped diaphragm member 23 as will be best seen in FIGURE 2. Diaphragm 23 has a lip indicated at 24 which is clamped between the clamping plate 22 and the end plate 21 being secured thereto by the force exerted between these two members. The clamping plate 22 and the end plate 21 are secured together by means of a pair of threaded hubs 25 which extend through apertures 26 in the end plate, the hubs mounting suitable nuts or clamping means 30 which, when threaded down on the hubs, secure the parts in assembled relationship and clamp the diaphragm therebetween. End plate 21 includes a plurality of hubs or key members 32 spaced about the end plate 21 to correspond with the spacing of the slots 11 in the casing 10.

Clamping plate 22 also includes a centrally located internally threaded hub or air inlet 35 which also extends through an aperture 36 in the end plate 21 by means of which air may be introduced to the pressure chamber indicated at 40 defined between the diaphragm and the clamping plate 22. As shown in FIGURES 1 and 2, a suitable fitting 42 could be threaded into the air inlet or threaded hub 35 to introduce air into the working chamber of the motor. Clamping plate 22 includes an annular ridge 46 on the undersurface thereof against which the diaphragm rests to define an end position of diaphragm movement or a minimum position for the pressure chamber 40. The ridges insure transmission of the working fluid or air throughout the chamber as it is introduced into the same. As will be seen in FIGURES 1 and 2, the diaphragm assembly 20 mounts in one end of the casing in a detachable latching type connection or bayonet type connection with the hubs or keys 32 on the end plate 22 sliding into the slots 11 and with the entire assembly slightly rotated to reach the latch position or portion 12 of the slots.

As will be best seen in FIGURE 3, the diaphragm assembly has attached thereto a spring 50 which may be irregular in form and is connected to the diaphragm assembly 20 at its extremities which are positioned under the nuts 30 on the threaded hubs 25 of the clamping plate and with the extremities of the spring overlying the peripheral edge of the casing. In the latched position for the diaphragm assembly, the assembly or the end plate 21 is positioned slightly inside the edge or the extremity of the casing 10 and the spring 50 engaging the edges of the casing will bias the assembly in the latched or key position. While the spring 50 is shown irregular in form, it may take the form of a flexible plate secured to the casing either through the nuts 30 or through additional screw means (not shown).

Positioned within the diaphragm 23 is a deep cup-shaped member 52 which cup-shaped member serves basically as a piston type form for the diaphragm retaining the shape of the diaphragm and imparting the thrust or force from the same to a thrust member 55 abutting against the undersurface of the same. Cup-shaped member is dimensioned so that its length is substantially the same length as the loop of the diaphragm, the length or loop of the diaphragm being determined by the desired length of travel of the actuator. The surface of the cup-shaped forming member 52 and the inner periphery of the tubular casing form a rolling surface for the diaphragm as the expansion chamber is varied and the cup-shaped member is moved with the diaphragm upon expansion of the chamber. Thus, the cup-shaped member 52 and the inner walls of the tubular casing 10 cooperate with the diaphragm 23 to provide a piston like movable member with the diaphragm providing the rolling seal therebetween. Positioned adjacent the cup-shaped member 52 is the thrust member 55 which has integral therewith an output shaft 60, the shaft extending through the extent of the casing and beyond the end of the same with a suitable connecting portion, such as a threaded extremity 61, extending beyond the end of the casing 10.

The opposite extremity of the casing 10 from that which mounts the diaphragm assembly 20 has positioned therein a shaft guide member 65 which guide member includes a suitable sliding bearing surface 56 receiving the shaft 60 to journal the same. The shaft guide member is similarly shaped to the diaphragm clamping assembly and includes a flange section 66 which rests against the detent portions 14 in the opposite extremity of the casing to be retained therein. In assembly, the tubular casing will first receive the shaft guide assembly after which is inserted the output shaft and thrust member. The shaft guide member is held in position against the detent 14, of which there are preferably three about the periphery of the casing, by means of a return spring for the actuator indicated at 70. I have shown in FIGURE 2 a double spring or a spring in two sections such as indicated at 70 and 71 which may be provided to get the desired length of travel for the actuator with the desired spring rate. It should be recognized, however, that a single spring may be employed. In the present disclosure the two springs 70—71 act as a single spring and abut in the center of the actuator on a spring guide 75 which is also slideably journalled on the output shaft and includes a flange 76 against which the adjacent extremities of the springs 70—71 abut to make a single spring. Thus, in effect the springs 70—71 are single springs resting against the shaft guide member 65 at one extremity and the thrust member 55 at the other extremity to bias the cup-shaped member and hence the diaphragm toward the rest position of the actuator in which the diaphragm engages the ridges 46 on the clamping plate 22.

As previously indicated, the shaft guide extremity of the casing 10 may include, in place of the detents 14, a similar slotted latch assembly or detachable assembly such as is provided for the diaphragm assembly 20 mounting in the casing. In such a case, the shaft guide assembly would carry similar keys 32 to fit into slots retaining the guide in a manner similar to that in which the diaphragm assembly 20 is retained in the opposite end of the casing.

The actuator may be mounted in any manner. I have found it convenient to add a mounting bracket or plate 83 to the shaft guide extremity of the casing through screws such as indicated at 80 threaded into the shaft guide member to secure the plate thereto. The plate would include an aperture, such as is indicated by 84, through which the output shaft 60 extends. The plate may take any form suitable for securing the plate to the actuator and the actuator on whatever device or surface the actuator is to be mounted. This arrangement is only one of many which may be utilized in positioning or mounting the actuator for application.

The operation of this improved piston type pneumatic actuator is conventional in that air introduced through the fitting 42 into the pressure chamber or working chamber 40 will cause the diaphragm to move and hence the thrust member 52 positioned therein to move against the bias of the springs 70—71 or a single spring urging the thrust member 55 and hence the output shaft 60 in a working direction or out of the confines of the tubular casing member 10. The bias springs 70—71 or a single spring in place thereof will apply a force against the cup-shaped member 52 and hence the diaphragm 23 in the absence of pressure in the working chamber 40 to move the output shaft and hence the load attached thereto in the opposite direction.

This actuator may be readily assembled or disassembled merely by rotating the diaphragm assembly in the slots 11 such that the hubs 32 clear the latch portions 12 thereof. The bias of spring 50 requires that the diaphragm assembly first be deflected before rotation to clear the latch portions of the slots 11. The removal of the diaphragm assembly will remove the end plate 21, clamping plate 22 and the diaphragm, together with the cup-shaped member 52, permitting the output shaft and the springs and thereafter the shaft guide member 65 to be removed from the casing. In this manner the motor may be readily assembled or dis-assembled for periodic inspection, change of springs and even replacement of the diaphragm.

In considering this invention it should be remembered that the present description is intended to be illustrative only and the scope of the invention should be determined only by the appended claims.

I claim as my invention:

1. A pneumatic motor comprising, a cylindrical casing, a diaphragm assembly including a diaphragm secured to a supporting means with said diaphragm and said supporting means defining a pressure chamber therebetween and including an air inlet in said supporting means, means including key members and slotted latching means included at one extremity of said cylindrical casing and on said supporting means to provide a detachable latching connection between said cylindrical casing and said diaphragm assembly, a thrust member and a shaft positioned within said casing and cooperating with said diaphragm, a shaft guide means detachably positioned in the other extremity of said cylindrical casing member, spring means positioned within said cylindrical casing and abutting said thrust member and said shaft guide to urge said diaphragm against said supporting means, said diaphragm assembly and said cylindrical casing being positioned in a latched position such that said cylindrical casing member extends beyond said diaphragm assembly, and spring means attached to said diaphragm assembly and overlapping the end of said cylindrical casing to bias said diaphragm assembly in said latched position.

2. A pneumatic piston type actuator comprising, a cylindrical casing member, a plurality of notches at one extremity of said casing member, detent means at the other extremity of said casing member, a diaphragm assembly adapted to be positioned in said notches at one extremity of said casing member, said diaphragm assembly including an end plate having peripheral hubs adapted to fit into said notches and latch said assembly in said notches, a clamping plate included with said end plate, a cup-shaped diaphragm having a beaded lip positioned between said clamping and end plates, threaded hubs on said clamping plate extending through apertures in said end plate and including threaded retaining means clamping said end plates and said clamping plates together with said beaded lip of said diaphragm therebetween to retain said diaphragm, a tapped air inlet included in said clamping plate and extending through an aperture in said end plate, said diaphragm and said clamping plate defining an expansion chamber communicating with said tapped air inlet, a cup-shaped thrust member nested in said cup-shaped diaphragm and including an output shaft associated therewith extending within said casing, guide means having an aperture therein adapted to receive said output shaft and journal the same, said guide means being positioned in the opposite extremity of said cylindrical casing and secured thereto by said detent means, spring means positioned between said guide means and said cup-shaped thrust member and encircling said shaft, and flexible spring means secured to said end plate and overlying the extremity of said cylindrical casing securing said diaphragm assembly in said notches of said casing.

3. A pneumatic motor comprising, a cylindrical casing member open at both extremities and extending the full length of said motor, a diaphragm assembly, positioned within one extremity of said cylindrical casing member and including a diaphragm secured to a supporting means with said diaphragm and said supporting means defining a pressure chamber therebetween and having an air inlet through said supporting means, means including key members and slotted latching means included in said one extremity of said casing member and on said supporting means to provide a detachable latching connection between said casing member and said diaphragm assembly, a thrust member and a shaft positioned within said casing member and cooperating with said diaphragm, shaft guide means detachably positioned within the other extremity of said cylindrical casing member, and spring means positioned within said casing member and abutting said thrust member and said shaft guide means to urge said diaphragm against said supporting means.

4. A pneumatic motor comprising, a cylindrical casing member open at both extremities and extending the full length of said motor, a diaphragm assembly, positioned within one extremity of said cylindrical casing member and including a diaphragm secured to a supporting means with said diaphragm and said supporting means defining a pressure chamber therebetween and having an air inlet through said supporting means, means including key members and slotted latching means included in said one extremity of said casing member and on said supporting means to provide a detachable latching connection between said casing member and said diaphragm assembly, detent means included in the other extremity of said casing member, shaft guide means engaging said detent means to position said shaft guide means within the other extremity of said casing member, and spring means positioned within said casing member and abutting said thrust member and said shaft guide means to urge said diaphragm against said supporting means.

5. A pneumatic motor comprising, a cylindrical casing member open at both extremities and extending the full length of said motor, a diaphragm assembly including a multi-part support means and a diaphragm with a lip of said diaphragm clamped between the parts of said support means forming a pressure chamber between one of said parts and said diaphragm, means including a passage means in said support means providing an inlet conduit to said pressure chamber, a detachable latching connection between said cylindrical casing member and said diaphragm assembly for positioning said diaphragm assembly within one extremity of said cylindrical casing member, said detachable latching connection being included in part on said cylindrical casing member and in part on said diaphragm assembly, a thrust member positioned within said casing member and including an output shaft, shaft guide means detachably positioned within the other extremity of said cylindrical casing member, and a return spring encircling said shaft and bearing against said shaft guide means and said thrust member to bias said diaphragm in one direction.

6. A pneumatic motor comprising, a cylindrical casing member open at both extremities and extending the full length of said motor, a diaphragm assembly including a multi-part support means and a diaphragm with a lip of said diaphragm clamped between the parts of said support means forming a pressure chamber between one of said parts and said diaphragm, means including a passage means in said support means providing an inlet conduit to said pressure chamber, a detachable latching connection between said cylindrical casing member and said diaphragm assembly for positioning said diaphragm assembly within one extremity of said cylindrical casing member, said detachable latching connection being included in part on said cylindrical casing member and in part on said diaphragm assembly, a thrust member positioned within said casing member and including an output shaft, a shaft guide means, means included in the other extremity of said casing member and on said shaft guide means for positioning said shaft guide means within the other extremity of said casing member, and a return spring encircling said shaft and bearing against said shaft guide means and said thrust member to bias said diaphragm.

7. A pneumatic motor comprising, a cylindrical casing member open at both extremities and extending the full length of said motor, a diaphragm assembly positioned within one extremity of said cylindrical casing member and including a diaphragm secured to a supporting means with said diaphragm and said supporting means defining a pressure chamber therebetween and having an air inlet through said supporting means, means including key members and slotted latching means included in said one extremity of said casing member and on said supporting means to provide a detachable latching connection between said casing member and said diaphragm assembly, a thrust member and a shaft positioned within said casing member and cooperating with said diaphragm, shaft guide means detachably positioned within the other extremity of said cylindrical casing member, spring means positioned within said casing member and abutting said thrust member and said shaft guide means to urge said diaphragm against said supporting means, and means included on said diaphragm assembly and cooperating with said one extremity of said casing member being effective to normally hold said key members and said latching means in said latching connection.

8. A pneumatic motor comprising, a cylindrical casing member open at both extremities and extending the full length of said motor, a diaphragm assembly including a multi-part support means and a diaphragm with a lip of said diaphragm clamped between the parts of said support means forming a pressure chamber between one of said parts and said diaphragm, means including a passage means in said support means providing an inlet conduit to said pressure chamber, a detachable latching connection between said cylindrical casing member and said diaphragm assembly for positioning said diaphragm assembly within one extremity of said cylindrical casing member, said detachable latching connection being included in part on said cylindrical casing member and in part on said diaphragm assembly, a thrust member positioned within said casing member and including an output shaft, shaft guide means detachably positioned within the other extremity of said cylindrical casing member, a return spring encircling said shaft and bearing against said shaft guide means and said thrust member to bias said diaphragm in one direction, and means included on said diaphragm assembly and cooperating with said one extremity of said casing member being effective to normally hold said key members and said latching means in said latching connection.

References Cited in the file of this patent
UNITED STATES PATENTS

| | | |
|---|---|---|
| 88,243 | Polman | Aug. 7, 1906 |
| 2,939,486 | Demay | June 7, 1960 |